United States Patent [19]

Staple et al.

[11] Patent Number: 5,390,543
[45] Date of Patent: Feb. 21, 1995

[54] METHOD AND APPARATUS FOR IN-FLIGHT SHAKE TESTING OF AN AIRCRAFT FUSELAGE

[75] Inventors: Alan E. Staple, Stoke-sub-Hamdon; Daniel M. Wells, Yeovil; Andrew L. Jordan, Langport, all of England

[73] Assignee: Westland Helicopters Limited, Yeovil, England

[21] Appl. No.: 69,356

[22] Filed: Jun. 1, 1993

[30] Foreign Application Priority Data

Jun. 3, 1992 [GB] United Kingdom ............... 9211719

[51] Int. Cl.6 .................................................. G01H 1/00
[52] U.S. Cl. ................................... 73/583; 244/17.11; 364/508
[58] Field of Search .......................... 73/583, 662, 669; 364/508; 244/17.13, 17.11

[56] References Cited

U.S. PATENT DOCUMENTS

| | | | |
|---|---|---|---|
| 3,074,385 | 11/1963 | Nass | 73/583 |
| 3,552,192 | 7/1971 | Grosser | 73/583 |
| 3,606,233 | 9/1971 | Seharton et al. | 244/17.25 |
| 3,686,927 | 8/1972 | Scharton | 73/583 |
| 3,690,607 | 9/1972 | Mard | 244/17.25 |
| 4,405,101 | 9/1983 | Carlson et al. | 244/17.27 |
| 4,470,121 | 4/1984 | Ebert | 73/583 |
| 4,809,553 | 2/1989 | Reed, III | 73/583 |
| 4,819,182 | 3/1989 | King et al. | 364/508 |
| 4,929,874 | 5/1990 | Mizuno et al. | 318/128 |
| 5,082,421 | 1/1992 | Acton et al. | 415/118 |
| 5,219,143 | 6/1993 | Staple et al. | 244/17.11 |

Primary Examiner—Hebron E. Williams
Assistant Examiner—Helen C. Kwok
Attorney, Agent, or Firm—Larson & Taylor

[57] ABSTRACT

A force-generating actuator connected at or across points of a structure capable of relative motion at an exciting frequency is operated to input a predetermined load into the structure and the response of the structure is measured for analysis. In one form of the invention the actuator is one of a plurality of actuators of an active vibration control system which is isolated and operated independently in a shake test mode. Advantageously, especially in a helicopter application, the remaining actuators can continue to be operated to reduce background vibration.

9 Claims, 2 Drawing Sheets

METHOD AND APPARATUS FOR IN-FLIGHT SHAKE TESTING OF AN AIRCRAFT FUSELAGE

BACKGROUND OF THE INVENTION

1. Field of the Invention

This invention relates to a method and apparatus for in-flight shake testing of an aircraft fuselage.

2. Description of the Prior Art

In the development testing of both fixed wing aircraft and helicopters it is current practice to employ a shake testing technique to identify fuselage dynamic response characteristics to vibration exciting frequencies in order that suitable modifications can be incorporated to ensure that such response characteristics will be maintained within acceptable limits.

In-flight shake testing is a known test procedure for flutter substantiation on fixed wing aircraft. Such procedures can be accomplished using "bolt-on" inertia devices either electrically or hydraulically driven, and some examples of such devices and procedures are disclosed in U.S. Pat. No. 3,074,385, U.S. Pat. No. 3,552,192, U.S. Pat. No. 4,470,121 and U.S. Pat. No. 4,809,553. Traditionally, shake testing of a helicopter fuselage has been accomplished with the helicopter on the ground, and in some cases with the helicopter suspended from an overhead support attached to the rotor head to simulate a flying vehicle. One such method and apparatus for achieving such testing involves attaching external shakers and forcing vibration with random or sine swept excitations and measuring response characteristics throughout the airframe. The reasons for using this method are mainly economic although the accessibility of the fuselage for changing locations of the shakers and measuring means is another factor.

Drawbacks of such a ground based system are mainly related to nonlinearities within the fuselage which produce dynamic characteristics which vary with applied forcing and, in themselves, required detailed investigation. Furthermore, in an operational helicopter, very high loads are induced into the fuselage by main rotor torque balance and cannot be represented in ground based testing. Similarly, important operational gearbox attachment load distributions cannot be represented. These factors mean that a desire to enhance the operational characteristics of helicopters by in-depth analytical studies of fuselage dynamic characteristics are being frustrated.

An objective of this invention therefore is to provide a method and apparatus for shake testing an aircraft fuselage which overcomes these drawbacks. A further objective is to achieve that objective by providing a method and apparatus for in-flight shake testing of an aircraft fuselage.

SUMMARY OF THE INVENTION

Accordingly, in one aspect, this invention provides a method for in-flight shake testing of an aircraft structure comprising the steps of connecting a force-generating actuator at or across points on the structure capable of relative motion at an exciting frequency, operating the actuator so as to input a predetermined load at a predetermined frequency into the structure, and measuring the response of said structure to said input.

In another aspect this invention provides a method for in-flight shake testing of an aircraft structure having an active vibration control system comprising a plurality of force-generating actuators connected at or across points on the structure capable of relative motion at exciting frequencies for inputting controlling forcing loads into the structure to reduce vibration thereof, the method comprising the steps of isolating at least one said actuator from the vibration control system, operating that actuator independently of the vibration control system so as to input a predetermined load at a predetermined frequency into the structure, sensing the response of said structure to said input and recording said response.

Preferably, the method comprises the further step of continuing to operate the active vibration control system through the remaining actuators so as to reduce background vibration of the structure and enable a high ratio of response signal to background vibration signal to be achieved.

In yet another aspect this invention provides apparatus for in-flight shake testing of an aircraft structure comprising a force-generating actuator connected at or across points on the structure capable of relative motion at an exciting frequency, control means for operating said actuator to input predetermined shake test excitation forces into said structure and measuring means for measuring the response of said structure.

In yet a further aspect, this invention provides apparatus for in-flight shake testing of an aircraft structure having an active vibration control system including a plurality of force-generating actuators connected at or across points on the structure capable of relative motion for inputting controlling forcing loads into the structure to reduce vibration thereof, characterised by control means for isolating at least one said actuator from the vibration control system and operating that actuator to input predetermined shake test excitation forces into the structure for shake testing the structure, sensing means for sensing the structure response to said excitation forces and recording means for recording the structure response.

The control means may comprise a device containing predetermined test signals and an electronic actuator control unit for receiving said test signals, converting the test signals to actuator control signals, and supplying said control signals to said isolated actuator.

The device may comprise a cassette tape recorder including a pre-recorded audio tape containing said predetermined test signals.

The test signals may be of any suitable form and may be swept sinusoid signals.

Said sensing means may comprise a plurality of accelerometers located at predetermined locations on the structure, and said recording means may comprise at least one vibration recorder connected to record signals output by said accelerometers.

Said electronic actuator control unit my conveniently be adapted to selectively enable/disable said actuator and to supply an actuator force reference signal to said recording means.

In one form of the invention the structure my comprise a helicopter fuselage and said actuator may be located in a strut interconnecting a gearbox and said fuselage.

One of said parts of the structure may comprise a seismic mass.

BRIEF DESCRIPTION OF THE DRAWINGS

The invention will now be described by way of example only and with reference to the accompanying drawings in which.

DETAILED DESCRIPTION OF THE DRAWINGS

Figure 1:
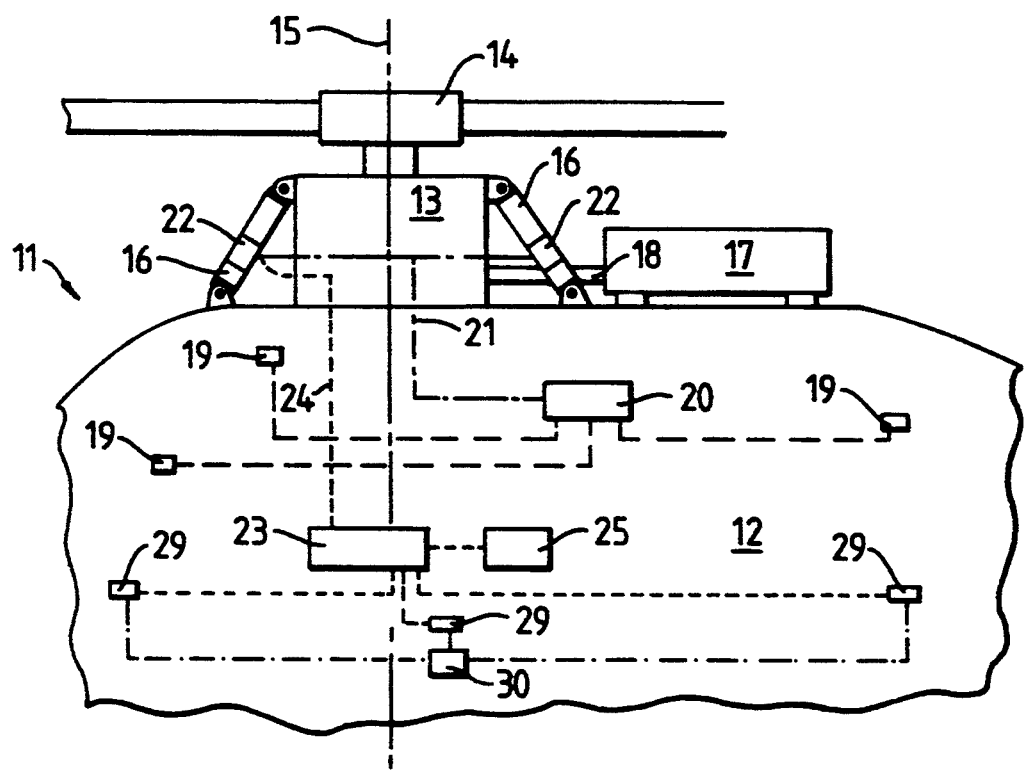
FIG. 1 is a schematic arrangement of one embodiment of the invention installed on a helicopter.

In planning the development of a new helicopter, applicant decided to attempt to introduce a much more in-depth study of the fuselage dynamic characteristics than had hitherto been possible with traditional ground shake testing techniques. It was argued that this would improve the diagnosis of any localized troublesome vibration characteristics that might become evident in development as well as enabling the overall characteristics of the helicopter to be identified and improved.

It quickly became evident that some form of in-flight shake testing was the only answer that would allow modal identification of the helicopter structure in its operational environment, correctly loaded and with the correct, truly representational, rotor dynamics.

As previously mentioned, in-flight shake testing was known to be a required test procedure for flutter substantiation on fixed wing aircraft and some in-flight shake tests of the helicopter using an inertia exciter device ("shaker") similar to that used for fixed wing aircraft were undertaken. However the shaker-induced response characteristics were swamped by high rotor induced responses experienced in the fuselage of the helicopter under test and consequently great difficulty was experienced in identifying the shaker-induced responses for subsequent analysis.

The helicopter concerned was fitted with an active vibration reducing system known as Active Control of Structural Response (ACSR) which had been pioneered by applicant. ACSR is described in U.S. Pat. No. 4,819,182 and, briefly, comprises a plurality of force-generating actuators connected at or across locations between points on a structure which are capable of relative motion at dominant vibration forcing frequencies. A number of sensors measure the vibration response at key locations on the fuselage in which vibration is to be reduced and the resulting signals are fed to an adaptive computer/controller which provides optimal signals to the actuators to produce forces having complex phase and magnitude characteristics at the sensor locations in the fuselage to reduce vibration at those locations. The actuators are powered by pulsed fluid supplies, preferably hydraulic supplies.

The location of the actuators is critical for successful vibration control and preferably they are located in the load paths through which the vibration generated by the vibration source is transmitted. To that end, in the helicopter under development, the force-generating actuators were incorporated in each of four external angled strut assemblies interconnecting the gearbox and fuselage, which strut assemblies all had the dual purpose of transmitting primary lift and manaeuvering loads whilst permitting the actuators to input the required controlling forcing loads into the fuselage to reduce vibration.

Alternative suitable forms of strut assembly for this purpose are disclosed in co-pending European Patent Applications No. 92301331.2 (EP-A-0501658) and 92309938.6 (EP-A-0542453).

Referring now to FIG. 1, a helicopter generally indicated at 11 has a fuselage 12 carrying a gearbox 13 driving a main sustaining rotor 14 about a generally vertical axis 15. Gearbox 13 is supported from fuselage 12 by at least four strut assemblies 16 (two only being shown) attached between the gearbox 13 and fuselage 14. Gearbox 13 is driven by at least one engine 17 through shaft 18.

Each of the strut assemblies 16 comprises a primary load path for transmitting primary flight and manaeuvering loads, generated by the rotor 14, free the gearbox 13 to the fuselage 12.

Helicopter 11 includes an ACSR active vibration control system as described in the aforementioned GB-A-2160840. Basically the system comprises a plurality of vibration sensors 19, e.g. accelerometers, located at strategic positions throughout the fuselage 12 and connected to an adaptive computer control unit 20 which provides signals 21 to an axially extendable electrohydraulic actuator 22 located integrally in each of the strut assemblies 16 for inputting forcing loads into the fuselage 12 as described in GB-A-2160840.

In considering the requirement for in-flight shake testing of a helicopter fuselage the inventors realized that excitation should preferably be produced by a forcing mechanism within the airframe and that the location of the ACSR actuators and their intended purpose of inputting forces into the fuselage might be appropriate for the input of excitation forces for shake testing purposes.

Problems likely to be encountered in respect of such a system installed in a helicopter concerned data analysis and in particular, in the light of the aforementioned experience with the use of a conventional shaker, in providing sufficient force to obtain structural responses in excess of background vibration levels and in identifying excitation response in a vibration signal dominated by main rotor forcing frequencies. Further investigations showed that the force actuators of the particular ACSR system were capable of operating within a required frequency range of 5 Hz to 30 Hz and were capable of inputting a force up to 30 KN into the fuselage. This indicated to the inventors firstly that the ACSR actuators would be an appropriate means for applying in-flight shake test excitation forces directly into the fuselage and secondly that the actuator output force level would be adequate to produce the required large fuselage response to excitation, and this encouraged them to design and develop the method and apparatus for in-flight shake testing according to this invention.

Thus, in a broadest stand alone embodiment especially for applications in which background vibration levels are low enough not to mask the excitation responses, this invention provides a method and apparatus for in-flight shake testing of an aircraft structure comprising connecting a force-generating actuator at or across points on the structure capable of relative motion at an exciting frequency, operating the actuator so as to input a predetermined load at a predetermined frequency into the structure, and measuring the response of the structure.

In the ACSR system of the described embodiment, the individual actuators can be selectively isolated from the system in order to retain a vibration reduction system, albeit at a lesser level of efficiency, in the event of a failure of one actuator. The inventors reasoned that if a functional actuator of the ACSR system was isolated from that system and controlled separately to provide the shake test excitation input forces, and the remaining three actuators continued to operate as part of the ACSR system to reduce rotor induced vibration, then a high signal to noise ratio might be obtainable to overcome the remaining problem of identifying the shake test excitation response in a helicopter application.

In accordance with the invention, an electronic actuator control unit 23 is mounted in fuselage 12 and is connected to an electrical supply (not shown). An output signal is routed through connection 24 to the actuator 22 of a pre-selected one of the struts 16 interconnecting the gearbox 13 and the fuselage 12. The choice of actuator is determined prior to installation.

A control device comprising a cassette tape recorder 25 is connected to the control unit 23 to supply required test signals and to that end is fitted with an audio tape containing pre-recorded signals of swept or stepped sinusoid and random frequency patterns.

The control unit 23 is also connected to a plurality of vibration sensors such as accelerometers 29 which in turn are connected to a vibration recorder 30.

In operation, it is first decided which particular test sequence is to be run and the recorder 25 is adjusted to appropriately position the pre-recorded audio tape. The test signal is routed to the control unit 23 which contains appropriate electronics cards to perform three basic functions; firstly to enable/disable the selected one of the actuators 22; secondly to convert the test signal from the tape recorder 25 to an output signal 24 to operate the selected actuator 22 to input the required excitation force; and thirdly to supply an actuator force reference signal to the vibration recorder 30.

Various test sequences can be run consecutively by appropriate re-positioning of the audio tape in the tape recorder 25.

The structural response to the excitation force is sensed by the vibration sensors 29 and recorded by the recorder 30 for subsequent analysis.

Figure 2:
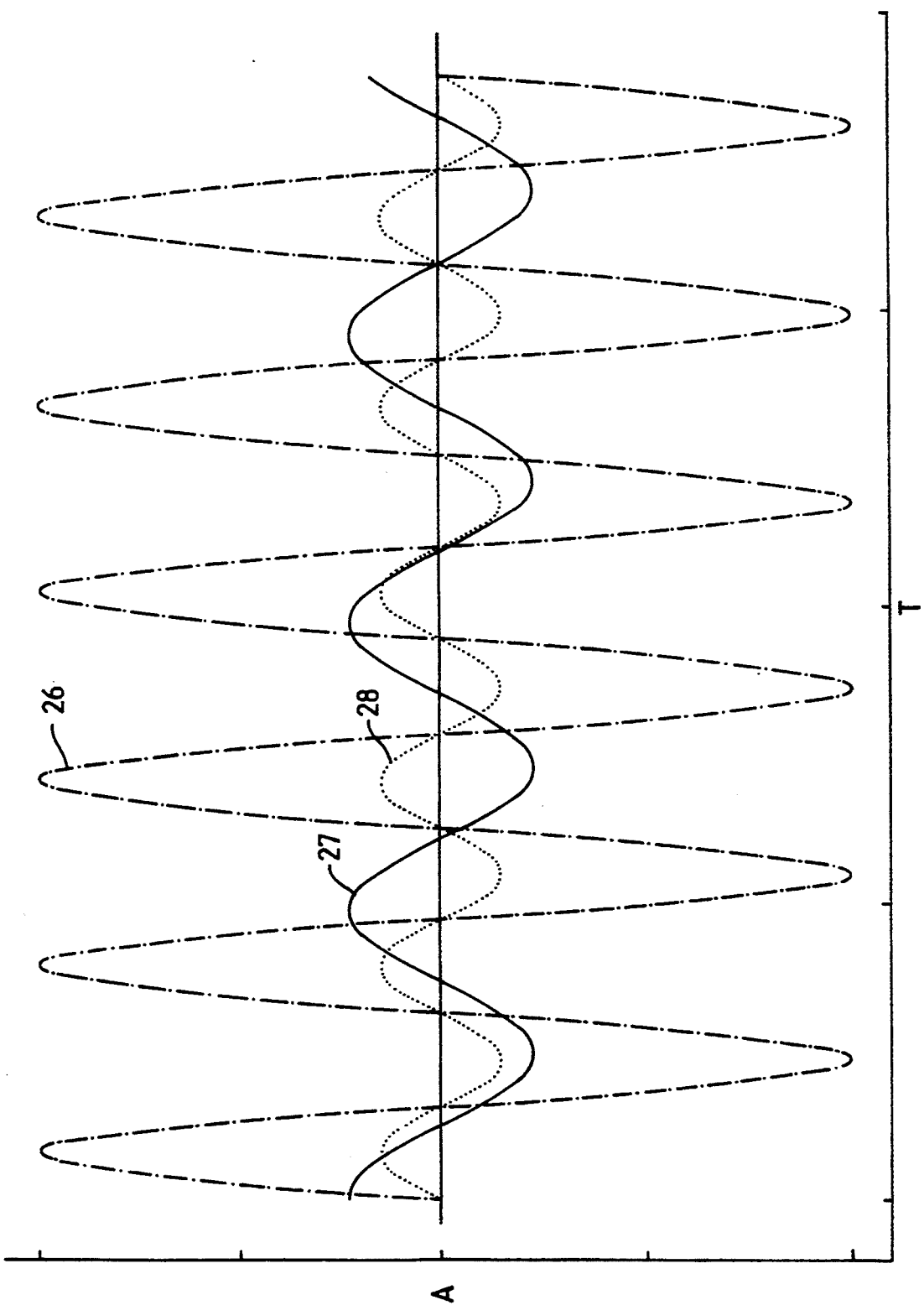
FIG. 2 is a graph illustrating an operational feature of the embodiment of FIG. 1.

FIG. 2 plots amplitude (A) against time (T) and illustrates the aforementioned benefit, particularly in respect of in-flight shake testing of a helicopter, of the combination of this invention with an active vibration control system such as ACSR.

The drawing shows for the helicopter under test the relative amplitudes of a vibration signal 26 at the blade passing frequency (5 R for a five blade main sustaining rotor) without operation of ACSR, and a typical vibration response signal 27 due to operation of an in-flight shake test according to this invention. The low ratio between the response signal 27 and the background vibration signal 26 would, as hereinbefore mentioned, cause problems in identifying the excitation response signal 27 due to its domination by the high amplitude of the signal 26.

However with the ACSR system operating, through the remaining three actuators 22 in their respective struts 16, the 5 R vibration signal is smoothed and much reduced as indicated by dotted line 28 in FIG. 2. This clearly improves the ratio of response signal 27 to background signal 28 to ease identification of the response signal and significantly improve accuracy of analysis of the response signal.

Thus, the method and apparatus of this invention provides for in-flight shake testing which allows modal identification of a helicopter fuselage in its operational environment, correctly loaded and with truly representative rotor dynamics.

Moreover, apart from its benefits in development testing, the permanent availability of the installation of this invention in the aircraft provides important advantages by providing a readily available health monitoring facility.

Thus, the system can be operated in flight at regular intervals and the response characteristics compared with previous tests either instantaneously or subsequently at a ground station so as to highlight immediately any significant change in the response characteristics. Investigative procedures will then be initiated to diagnose the cause and, if necessary, repairs undertaken to cure any faults. Such a permanent health monitoring facility therefore greatly enhances the safety of the aircraft and its occupants.

Although, as herein described, of particular benefit in respect of in-flight shake testing of a helicopter fuselage structure especially when the helicopter is fitted with an active vibration control system, the invention can also be of benefit in other helicopter and fixed wing aircraft applications again either as a stand alone system where background vibration levels are sufficiently low so as not to mask the response to shake test excitation frequencies, or in combination with any suitable means for reducing a troublesome background vibration such as the described active vibration control system.

Whilst one embodiment has been described and illustrated it will be understood that many modifications may be made without departing from the scope of the invention. The invention can be incorporated in actuator systems in which one of the points on the structure is a connection to a seismic mass for reacting actuator loads to generate the required excitation loads instead of the actuation system of the described embodiments in which the actuators are connected between two points of the actual aircraft structure, e.g. between the gearbox and the fuselage. Alternative means for providing the predetermined test signals could comprise an analogue signal generator or a computer with appropriate interfaces. The control means may be arranged to isolate and operate any one of a plurality of actuators for shake test purposes and may be arranged to operate the actuators in a predetermined sequence. More than one actuator of a plurality of actuators may be operated in unison in the shake test procedure.

What is claimed is:

1. A method for in-flight shake testing of an aircraft structure having an active vibration control system comprising a plurality of force-generating actuators connected on the structure for inputting controlling forcing loads into the structure to reduce vibration thereof, comprising the steps of isolating one of said actuators from the vibration control system, operating said one of said actuators independently of the vibration control system so as to input a predetermined load at a predetermined frequency into said aircraft structure to excite said aircraft structure to vibrate, sensing the vibration of said aircraft structure to said input and recording said vibration.

2. A method according to claim 1, including the further step of continuing to operate the active vibration control system through said plurality of force-generating actuators so as to reduce background vibration of the structure and enable a high ratio of response signal to a background vibration signal to be achieved.

3. Apparatus for in-flight shake testing of an aircraft structure having an active vibration control system including a plurality of force-generating actuators connected on said structure for inputting controlling forcing loads into said aircraft structure to reduce vibration thereof, control means for isolating one of said actuators from the vibration control system and operating said one of said actuators to input predetermined shake test excitation forces into said aircraft structure to excite said aircraft structure to vibrate for shake testing said aircraft structure, sensing means for sensing the vibration of said aircraft structure to said shake test excitation forces and recording means for recording said vibration.

4. Apparatus as claimed in claim 3, wherein said control means comprise a device containing predetermined test signals and an electronic actuator control unit for receiving said test signals, converting said test signals to actuator control signals and supplying said control signals to said one of said actuator.

5. Apparatus as claimed in claim 4, wherein said device comprises a cassette tape recorder including a pre-recorded audio tape containing said predetermined test signals.

6. Apparatus as claimed in claim 4, wherein said predetermined test signals are swept sinusoid signals.

7. Apparatus as claimed in claim 3 wherein said sensing means comprise a plurality of accelerometers located at predetermined locations on the structure.

8. Apparatus as claimed in claim 7 wherein said recording means comprise at least one vibration recorder connected to record signals output by said accelerometers.

9. Apparatus as claimed in claim 4 wherein said electronic actuator control unit is adapted to selectively enable and disable said actuators and to supply an actuator force reference signal to said recording means.

* * * * *